United States Patent [19]
Erdmenger et al.

[11] 3,809,140
[45] May 7, 1974

[54] CONCENTRATION OF MATERIALS

[75] Inventors: Rudolf Erdmenger, Bergisch Gladbach; Martin Ullrich, Opladen; Manfred Hederich, Leverkusen-Schlebusch, all of Germany

[73] Assignee: Bayer Aktiengesellschaft, Leverkusen, Germany

[22] Filed: Dec. 23, 1970

[21] Appl. No.: 101,090

[30] Foreign Application Priority Data
Dec. 24, 1969  Germany............................ 1964946
Dec. 24, 1969  Germany............................ 1964949

[52] U.S. Cl. ............................. 159/2 E, 159/47
[51] Int. Cl. ........................... B01d 1/28, B01d 1/00
[58] Field of Search .................... 159/2 E, 8–12, 159/2 R; 159/Dig. 10

[56] References Cited
UNITED STATES PATENTS

| | | | |
|---|---|---|---|
| 603,086 | 4/1898 | Joslin et al. | 159/11 X |
| 642,620 | 2/1900 | Mather | 159/11 |
| 2,046,489 | 7/1936 | Sasse et al. | 159/11 |
| 2,709,487 | 5/1955 | Boon | 159/11 |
| 2,970,089 | 1/1961 | Hunt et al. | 203/91 |
| 3,004,900 | 10/1961 | Hunt et al. | 202/191 |
| 3,008,940 | 11/1961 | Wagner et al. | 260/88.2 |
| 3,078,511 | 2/1963 | Street | 260/95 X |
| 3,280,090 | 10/1966 | Scoggin | 260/94.9 F |
| 2,439,384 | 4/1948 | Fetzer | 127/58 |
| 3,025,565 | 3/1962 | Doriat et al. | 264/102 |
| 3,082,816 | 3/1963 | Skidmore | 159/2 E X |
| 3,118,744 | 1/1964 | Erdmenger et al. | 34/183 |
| 3,280,886 | 10/1966 | Marshall et al. | 159/2 E X |
| 3,395,746 | 8/1968 | Szabo et al. | 159/2 E X |

*Primary Examiner*—Jack Sofer
*Attorney, Agent, or Firm*—Burgess, Dinklage & Sprung

[57] ABSTRACT

In the concentration of materials, e.g., a solution of polymers, by discharging the material from an expansion nozzle into an evaporating chamber, the degree of the concentration is increased so that the concentrated material is no longer fluid. Such operation is made feasible by disposing screw conveying means in the discharge of the evaporating chamber for withdrawal of the material. Efficiency of the concentration is increased. The material can be further concentrated in evaporating chambers through which the conveying means carry the material.

10 Claims, 4 Drawing Figures

CONCENTRATION OF MATERIALS

BACKGROUND

The present invention relates to an apparatus for concentrating material. e.g., a solution or suspension, the apparatus comprising an expansion nozzle connected to a supply pipe and opening into an expansion chamber having a gas outlet.

Using such apparatus, solutions are vaporised by expansion. A solution, which may be heated, is expanded from a chamber of higher pressure into a chamber of lower pressure. Corresponding to the heat content of the initial solution and the boiling point of the solvent, a partial vaporisation and a phase separation into solvent vapor and concentrate takes place with cooling. The solution as thus concentrated is substantially more viscous than the initial solution, because of the increase in concentration and because of the cooling with the expansion. The expansion-evaporation by means of a nozzle is only carried out to such an extent that a concentrate which still flows and is easy to handle is formed, because a highly viscous concentrate adheres to the walls of the expansion chamber and also can only be conveyed mechanically with great difficulty.

Concentration beyond that effected in expansion evaporators, is commonly carried out in screw evaporators.

A four-shaft screw evaporator is known for concentrating viscous solutions to the required final concentration. This machine, by suitable movement of material, accelerates the often difficult operation of the residual evaporation of the solvent from the viscous solution, which operation otherwise is only established by slow diffusion. It operates economically in the highly viscous phase with narrow distribution of residence times and steady further concentration of the solution as it passes along the screw machine. The charging of the screw evaporator with an easily flowing solution is found to be disadvantageous, since then a longitudinal mixing (i.e., "back mixing") and thus a re-dilution of already concentrated solution occurs, caused by a projection of the solution in or above the screw shafts which are freely exposed in the evaporation zones.

The necessity consequently arises of charging a screw evaporator with viscous solution which is as concentrated as possible, whereas heretofore this solution had to be capable of still flowing and being pumped, for conveying and proportioning purposes.

THE INVENTION

The present invention has for an object to improve the known apparatus for expansion vaporisation, so that the solutions or suspensions can be concentrated to a far higher degree than hitherto expansion by means of a nozzle, without the occurrence of the aforementioned disadvantages, i.e., deposit and build-up of solids on walls of the equipment.

The present invention has for another object to provide a process and an apparatus by which solutions or suspensions can be converted from a low viscous form into a highly concentrated end product of highest possible viscosity, in which the disadvantages as described of the prior known processes and apparatus, e.g., back mixing in the screw evaporator, are avoided and a higher degree of concentration is obtained.

EXPENSION EVAPORATION

The first mentioned object is achieved according to the invention by the expansion chamber being provided with a screw discharge device, which may comprise at least two screws. The result hereby obtained is that the solution or suspension can be concentrated to such a degree by means of the expansion evaporation that the material is obtained in plastic form, for example, in the form of flakes or cakes or a high viscous foam-strand, and, in such form, is taken up by the screw discharge device. The screw discharge device can be so designed that it has a self-cleaning action, that is to say, the screw threads of the screw shafts can mutually scrape one another, providing a cleaning action. It is immaterial in principle whether the screw shafts rotate in opposite directions or in the same direction. However, it has been found that the arrangement rotating in opposite directions causes a better conveying action, because the product falling from the expansion nozzle is taken up by the screws, especially when these latter rotate so that the material when taken up by the screws is moved to between the screws.

According to one particular embodiment of the apparatus according to the invention, the screw discharge device comprises four screw shafts, which are arranged in V-formation. They function in advantageous manner so as to be self-cleaning and are preferably rotatable to move the material when taken up by the screws toward the center of the V-formation. The screw threads advantageously have a low pitch, so that the conveyed material forms a sealing plug in the screw housing and is thus able to leave the outlet opening of the screw discharge device in highly viscous form. The use of an array of screws in a V-formation has the advantage that the expansion chamber at the inlet end of the screw machine is kept particularly wide, so that all of the pre-concentrate falls directly on to the screw shafts, and thereby in this zone is no danger of any caking on the walls.

According to another particular development of the invention, the wall of the expansion chamber and the external casing of the expansion nozzle are fitted with cooling elements. These have the effect that some of the solvent vapors condenses on the surfaces in the expansion chamber. The resulting thin film on the cooled surfaces prevents adherence and build-up of material on those surfaces.

SCREW EVAPORATION

The second mentioned object is achieved according to the invention by the solution or suspension expanded from a nozzle being expanded directly into a screw evaporator as known per se and further concentrated therein. Thus, an expansion evaporator is combined with a screw evaporator according to the invention, with the screw conveyor means used to withdraw the product of expansion evaporator being used to convey the withdrawn material through further evaporation zones for screw evaporation.

The corresponding apparatus in accordance with the invention is characterized by the expansion nozzle, which is known per se, and opens into a screw evaporator as known per se, which is provided at its inlet end with an additional outlet pipe. The technical combination used in this process and apparatus makes possible an expansion evaporation up to a far higher concentration than hitherto possible and even to the point of solidification of the concentrate by cooling and thickening. The expansion nozzle can be operated in such a way that a large part of the solvent discharges with the expansion, and so the product to be concentrated already shows a considerable preliminary concentration with high viscosity. The pre-concentrate is obtained in the form of a high viscous foam-strand or even in the form of flakes or small lumps. It is immediately engaged by the screw shafts of the screw evaporator in the inlet zone, while the solvent vapors are carried away from the outlet pipe and are condensed in a manner known per se. The pressure difference to be chosen with the expansion depends on the nature of the solution or suspension and the required degree of pre-concentration.

The solution cooled and concentrated by the expansion is heated again in the screw machine by supply of heat through the heatable housing wall and by internal friction due to the conveying action in the screw housing, is possible melted and is further concentrated in the usual manner in the final evaporation zones and is ejected after reaching the permissible residual content of solvent. The solvent vapors being liberated in the screw evaporator by heat action are carried away through other outlet shafts and thereafter condensed. Depending on requirements, the end product is obtained either as a melt, by the product being forced out through an outlet opening, or it is obtained in solid, granular form so that it can be collected in a receiver.

Different evaporation pressures or vacua can be adjusted in the various evaporation zones of the screw machine. It is, however, a condition that the screw shafts act with a sealing action between the evaporation zones. This is achieved for example by a greatly reduced pitch of the screw threads.

With the evaporation of substances which are heat-sensitive, the process according to the invention provides the possibility, while avoiding undesirable, tedious pre-heating, of expanding the solution at a permitted, low temperature into the expansion chamber at the inlet end of the screw evaporator and of further concentrating the concentrate thus obtained with a narrow residence time spectrum and exact temperature control in the screw evaporator.

In order to be able to adapt the outlet quantity from the expansion nozzle to requirements, the invention provides for the expansion nozzle preferably having an adjustable throttling device.

SUMMARY OF THE INVENTION

Thus, the invention provides an improvement in apparatus for concentrating material by evaporation, such apparatus comprising a evaporation chamber for receiving the material, an outlet conduit for vapor evaporated from the material in the chamber, and a discharge opening in the lower part of the chamber for discharge of the concentrated material from the chamber. Feeding means are provided for introducing the material into the chamber above and spaced from said discharge opening, for evaporation effecting concentration as the material falls from the feeding means to said discharge opening. The improvement of the invention provides a screw conveyor means mounted in the discharge opening for removing the concentrated material from the chamber, e.g., over a horizontally extending path.

Preferably, the screw or screws of the conveyor means extend over substantially the entire discharge opening, as is shown in the accompanying drawings, shortly to be described in detail. Also, preferably the screw conveyor means includes a plurality of screws, and desirably includes two outer screws and means for rotating the outer screws in opposite directions and to move the material when taken up to between the outer screws, again, as is illustrated, for example, in the accompanying drawings. Another preferred feature is provision of at least three screws, desirably four screws, arranged in a V-formation.

The expansion evaporation as described above, can be combined with screw evaporation. For this purpose, a second evaporating chamber is provided for further concentration of the material, and the described screw conveyor means of the expansion evaporator is communicated with the second evaporation chamber for delivery of the material thereto. Desirably, the screw conveyor means is adapted to convey the material through the second evaporating chamber, i.e., the screw evaporator.

The process of the invention involves concentrating a fluid material by evaporation, and includes the steps of discharging the material into an evaporating zone for fall of the material therethrough by gravity and evaporation during said fall for the concentration. The evaporation is carried out during said fall to beyond the point where the material is fluid. The falling material is then intercepted with a screw conveyor means disposed in the lower part of the evaporating zone, and the material is removed from the evaporating zone with the screw conveyor means. Desirably, the screw conveyor means comprises at least two screws, and the material when discharged into the evaporation zone is aimed at between the screws.

EMBODIMENTS

Preferred embodiments of the invention are illustrated in the accompanying drawings, wherein.

Figure 1:
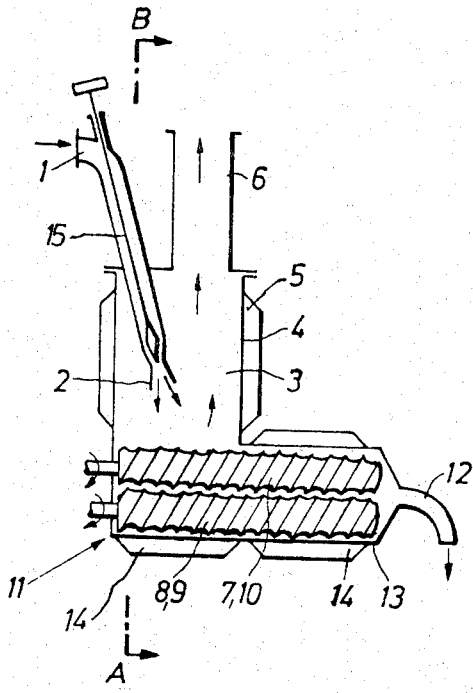
FIG. 1 is a diagrammatic showing of an expansion evaporator in longitudinal-vertical section.
Figure 2:
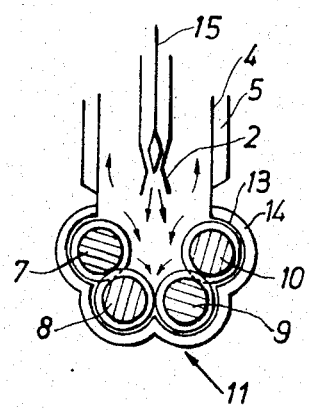
FIG. 2 is a cross-section taken on line A–B in FIG. 1.

Referring to FIG. 1 and FIG. 2, a solution which is to be concentrated is supplied by way of a supply pipe 1 and through an expansion nozzle 2 into an expansion chamber 3. The vertical walls 4 of the latter are provided with cooling elements 5 which condense some of the vapors on the walls 4 so that deposit and adherence of material on the wall 4 is prevented. The solvent vapors leave the expansion chamber through an outlet pipe 6 and are conveyed to a condenser (not shown), where they condense. A vacuum pump (not shown) can be connected to pipe 6. The concentrate, forming in the expansion chamber 3 as a high viscous foam-strand or as flakes, is taken up by the intake portion of cooperating screws 7, 8, 9 and 10 of a screw discharge device 11, arranged in a V-formation, and the material is forced through an outlet opening 12, so that it is obtained in highly viscous form. The screws rotate as shown in FIG. 2, so that the material is moved inwardly. The screw shafts are enclosed by a housing 13, which is equipped with temperature-control elements 14 for heating and/or cooling. The expansion nozzle 2 is provided with an adjustable throttling device 15.

In the following examples the chamber 3 is 21.0 cm. long (in the direction of the conveyor screws), and 14.5 cm. wide, and the discharge of the nozzle 2 is spaced about 24.0 cm. from the upper level of the screws.

Example 1

A 33 percent solution of an ethylene-vinylacetate-copolymer with a viscosity of 11,200 cP at 40°C. and with a specific heat capacity of 0.64 kcal/kg. °C in the solvent tertiary butylalcohol is forced by means of a gear wheel pump with a flow of 129 kg/h. and at a pressure of 22 kg/cm² through a double tube heat exchanger and is thereby heated from 45°C. to 125°C. This solution is concentrated in the expansion evaporator of FIGS. 1 and 2. It is expanded through a nozzle 2, which can be throttled, and into an expansion chamber 3 of a four-shaft screw discharge device 11, in which there is a pressure of 100 mm Hg. It is thereby concentrated from 33 percent to 55 percent polymer content and is cooled from 125°C. to 66°C. From the expansion nozzle 2, plastic cakes of concentrate which are no longer capable of flowing are forced at high velocity into the tank formed by the four screw shafts and completely taken up and drawn in by the screws rotating at 120 r.p.m. The phase separation into concentrate and solvent vapor takes place in the widening nozzle 2, between the nozzle 2 and screw shafts 7, 8, 9, 10 and, with compression of the partially foam-like concentrate, by reason of the action of the screw shafts on the material. The concentrate as thus produced, having a polymer content of 55 percent, is ejected by the four-shaft screw discharge device through a closed housing section and through a discharge opening 12, with a rate of flow of 77.3 kg/h. into the atmosphere or into a chamber which is under a required superatmospheric or subatmospheric pressure.

If the expansion evaporation is carried out in the manner which is already known, that is to say, without using a worm discharge device, the polymer solution can only be concentrated from 33 percent to about 40 percent polymer content, because of the flowability which is then necessary.

Figure 3:
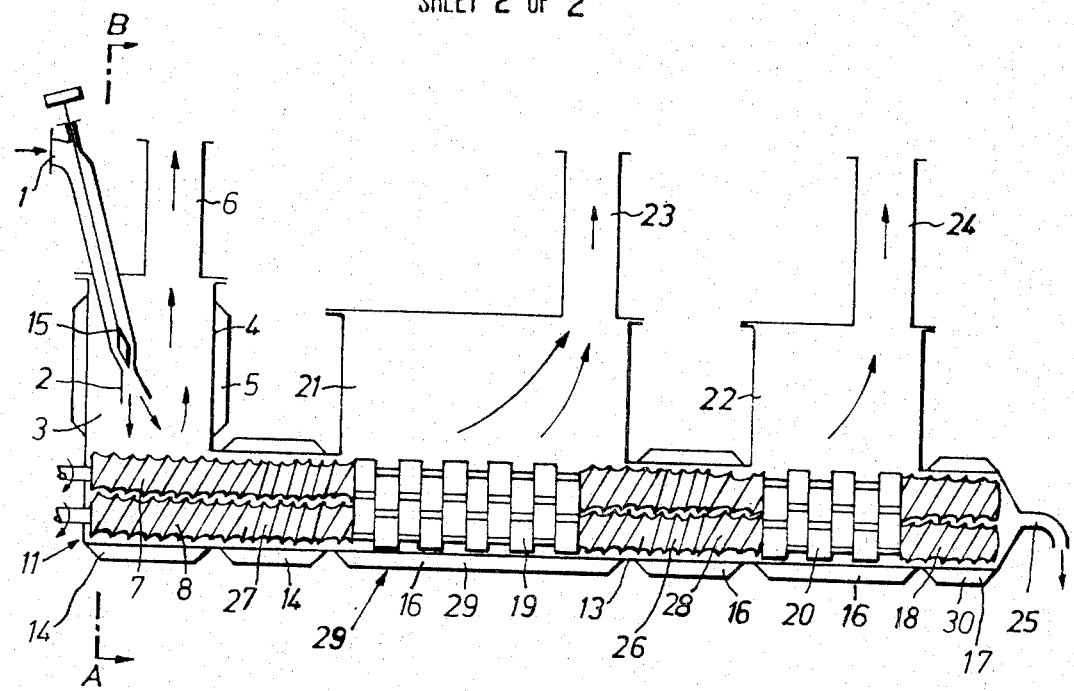
FIG. 3 is a diagrammatic showing of an expansion evaporator combined with a screw evaporator, in longitudinal-vertical section.
Figure 4:
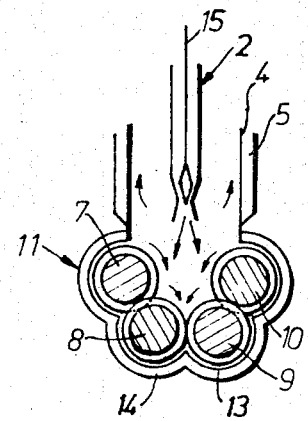
FIG. 4 is a cross-section taken on line A–B in FIG. 3.

Referring to FIGS. 3 and 4, the expansion evaporator 11 (FIG. 1) is combined with screw evaporator 29. The screw housing 13, is provided with heating jackets 16 in the evaporation regions and with cooling jacket 17 in the outlet region. The screw shafts themselves are provided with screwthreads 26 of relatively low pitch in the conveyor zones 27 and 28, while they have kneading discs in evaporation zones 19 and 20. The conveyor zones 27, 28 and 18 thus simultaneously serve the purpose of sealing off the evaporation zones 19 and 20 from the vacuum in the expansion chamber 3 and from one another and from the atmosphere, so that the various zones can be operated at different pressures. In the evaporation zones 19 and 20, the screw housing is widened out above the screw shafts into exhaust chamber 21 and 22, from which exhaust pipes 23 and 24 lead to condensers (not shown). The finally concentrated product leaves the screw evaporator 29 through the outlet 25.

EXAMPLE 2

The 55 percent polymer solution produced in Example 1 is further concentrated in known manner in the four-shaft screw evaporator of FIG. 3 and 4 having a screw external diameter of 50 mm., a screw length of 1,730 mm and an effective heating surface of 0.43 m². Pressures of 100 mm. Hg. are present in the evaporation zones 19 and 20 and these zones are heated with steam at 200°C. The solution is thus concentrated in the evaporation zone 19 from a polymer content of 55 percent up to 94 percent and further concentrated in the evaporation zone 20 to higher than 99.8 percent. A highly viscous melt with a temperature of 220°C. and a rate of flow of 42.5 kg/h is discharged from the screw machine 29, using a net driving power of 4.7 kW.

If the same screw evaporator, by way of comparison not using the coupling according to the invention with an expansion evaporation, is charged in the hitherto usual manner with a 33 percent solution of the same polymer which can still be pumped and is capable of flowing, then with the same final content of more than 99.8 percent, only 18.0 kg/h of concentrate is discharged.

EXAMPLE 3

A 65 percent solution of a heat sensible modified polyacrylate with a viscosity of 34,000 cP at 20°C in the solvent methylene-chloride is forced by means of a gear wheel pump with a flow of 68 kg/h and at a pressure of 5 kg/cm² through a double tube heat exchanger and is thereby heated from 17°C to 98°C. This solution is concentrated in the expansion evaporator of FIG. 1 and 2. It is expanded through a nozzle 2, which can be throttled, and into an expansion chamber 3 of a four-shaft screw discharge device 11, in which there is a pressure of 280 mm Hg. It is thereby concentrated from 65 percent to 90 percent polymer content and is cooled from 98°C to 46°C. From the expansion nozzle 2, a high viscous foam rope of concentrate which is no longer capable of flowing is forced at high velocity into the tank formed by the four screw shafts and completely taken up and drawn in by the screws rotating at 80 r.p.m. The phase separation into concentrate and solvent vapor takes place in the widening nozzle 2, between the nozzle 2 and screw shafts 7, 8, 9, 10 and, with compression of the partially foam-like concentrate, by reason of the action of the screw shafts on the material. The concentrate as thus produced, having a polymer content of 90 percent, is ejected by the four-shaft screw discharge device through a closed housing section and through a discharge opening 12, with a rate of flow of 49 kg/h into the atmosphere or into a chamber which is under a required superatmospheric or subatmospheric pressure.

If the expansion evaporation is carried out in the manner which is already known, that is to say, without using a worm discharge device, the polymer solution can only be concentrated from 65 percent to about 75 percent polymer content, because of the flowability which is then necessary.

EXAMPLE 4

The 90 percent polymer solution produced in Example 3 is further concentrated in known manner in the four-shaft screw evaporator of FIG. 3 and 4 having a screw external diameter of 50 mm, a screw length of 1,730 mm and an effective heating surface of 0.43 m². Pressures of 35 mm Hg are present in the evaporation zones 19 and 20 and these zones are heated with heated water at 90°C. The solution is thus concentrated in the evaporation zone 19 from a polymer content of 90 percent up to 96 percent and further concentrated in the evaporation zone 20 to 99.7 percent. A highly viscous melt of 700,000 cP with a temperature of 110°C and a rate of flow of 44 kg/h is discharged from the screw machine 29, using a net driving power of 3 kW.

EXAMPLE 5

A 9 percent solution of a polyisopren-caoutchuc in the solvent hexane is forced by means of a gear wheel pump with a flow of 67 kg/h and at a pressure of 6 kg/cm² through a double tube heat exchanger and is thereby heated from 20°C to 102°C. This solution is concentrated in the expansion evaporator of FIG. 1 and 2. It is expanded through a nozzle 2, which can be throttled, and into an expansion chamber 3 of a four-shaft screw discharge device 11, in which there is a pressure of 350 mm Hg. It is thereby concentrated from 9 percent to 13 percent polymer content and is cooled from 102°C to 56°C. From the expansion nozzle 2, a high viscous foam rope of concentrate which is no longer capable of flowing is forced at high velocity into the tank formed by the four screw shafts and completely taken up and drawn in by the screws rotating at 80 r.p.m. The phase separation into concentrate and solvent vapor takes place in the widening nozzle 2, between the nozzle 2 and screw shafts 7, 8, 9, 10 and, with compression of the partially foam-like concentrate, by reason of the action of the screw shafts on the material. The concentrate as thus produced, having a polymer content of 13 percent, is ejected by the four-shaft screw discharge device through a closed housing section and through a discharge opening 12, with a rate of flow of 46 kg/h into the atmosphere or into a chamber which is under a required superatmospheric or subatmospheric pressure.

EXAMPLE 6

The 13 percent polymer solution produced in Example 5 is further concentrated in known manner in the four-shaft screw evaporator of FIG. 3 and 4 having a screw external diameter of 50 mm, a screw length of 1,730 mm and an effective heating surface of 0.43 m². Pressures of 140 mm Hg and 20 mm Hg are present in the evaporation zones 19 and 20 and these zones are heated with steam at 155°C. The solution is thus concentrated in the evaporation zones 19 and 20 from a polymer content of 13 percent up to 99 percent. A highly viscous caoutchuc-substance with a temperature of 215°C and a rate of flow of 6 kg/h is discharged from the screw machine 29.

If the same screw evaporator, by way of comparison not using the coupling according to the invention with an expansion evaporation, is charged in the hitherto usual manner with a 9 percent solution of the same polymer which can still be pumped and is capable of flowing, then with the same final content of 99 percent, only 2.6 kg/h of concentrate is discharged.

What is claimed is:

1. In an apparatus for concentrating material by expansion evaporation, comprising:
   an evaporating chamber for receiving the material,
   an outlet conduit for vapor evaporated from the material in the chamber, and a discharge opening in the lower part of the chamber for discharge of the concentrated material from the chamber, and a vertically extending supply pipe having an expansion nozzle mounted on the discharge end thereof for introducing the material into the chamber above and spaced from said discharge opening for expansion evaporation effecting concentration as the material falls from the feeding means to said discharge opening,
   the improvement which comprises:
   said evaporation chamber being of unreduced cross-sectional area from the top to the bottom thereof, said discharge opening being of cross-sectional area as great as the cross-sectional area of the bottom of the evaporating chamber, screw conveyor means mounted in the discharge opening for receiving and removing the concentrated material from the chamber, the screw conveying means comprising at least three screws arranged in an upright V-formation, said expansion nozzle being adjacent the screws for discharge of material to within the nip of the screws,
   and at least a second evaporating chamber for further concentration of the material, said screw conveyor means extending to and through the following evaporating chamber(s) for delivery of the material thereto, and therethrough for said further concentration thereof.

2. Apparatus according to claim 1, the screw conveyor means including two outer screws, and means for rotating said screws and for rotating said outer screws in opposite directions and to move the material when taken up to between the outer screws.

3. Apparatus according to claim 1, and means for cooling the side walls of the evaporating chamber for condensing some of the vapors thereon, said cooling means comprising a jacket about the evaporating chamber for circulation of a coolant therethrough.

4. Apparatus according to claim 1, said screws being rotatable in the same direction.

5. Apparatus according to claim 1, the screw conveyor means comprising four screws arranged in a V-formation and means for rotating said four screws so that each of the four screws moves the material when taken up toward the center of the V-formation.

6. Apparatus according to claim 1, the screw conveyor means having screwthreads for conveying the material between the evaporating chambers, and kneading discs for conveying the material through said following evaporating chamber (s).

7. A process for concentrating fluid material by expansion evaporation comprising:
   a. discharging the material into a first evaporating zone through a vertically extending supply pipe having an expansion nozzle mounted on the discharge end thereof for fall of the material therethrough by gravity and evaporation during said fall for the concentration,
   b. carrying out the evaporation during said fall to beyond the point where the material is fluid and to only partially dry the material,
   c. intercepting substantially all the falling material with screw conveyor means disposed in the lower part of the first evaporating zone and removing it from the evaporating zone with the screw conveyor means, said screw conveyor means comprising at least three screws arranged in an upright V-formation, said expansion nozzle being adjacent the screws for discharge of material to within the nip of the screws, d. and further concentrating said material by heating in at least a second evaporation zone and conveying the material from the first evaporation zone to and through said following evaporation zone with said screw conveyor means.

8. Process according to claim 7, the screw conveyor means having screwthreads for conveying the material between the evaporating chambers, and kneading discs for conveying the material through said following evaporating chamber(s), maintaining a seal between evaporating zones, and maintaining different pressures in the sealed evaporating zones.

9. Process according to claim 7, said first evaporation zone being defined by walls extending over the length thereof, and circulating a coolant through a jacket disposed about the evaporatng zone for maintaining a film of condensate on the walls of the evaporation zone to thereby prevent adherence of material to the walls.

10. Process according to claim 9, wherein said fluid material is a solution of ethylene vinylacetate copolymer in tertiary butyl alcohol.

* * * * *